UNITED STATES PATENT OFFICE.

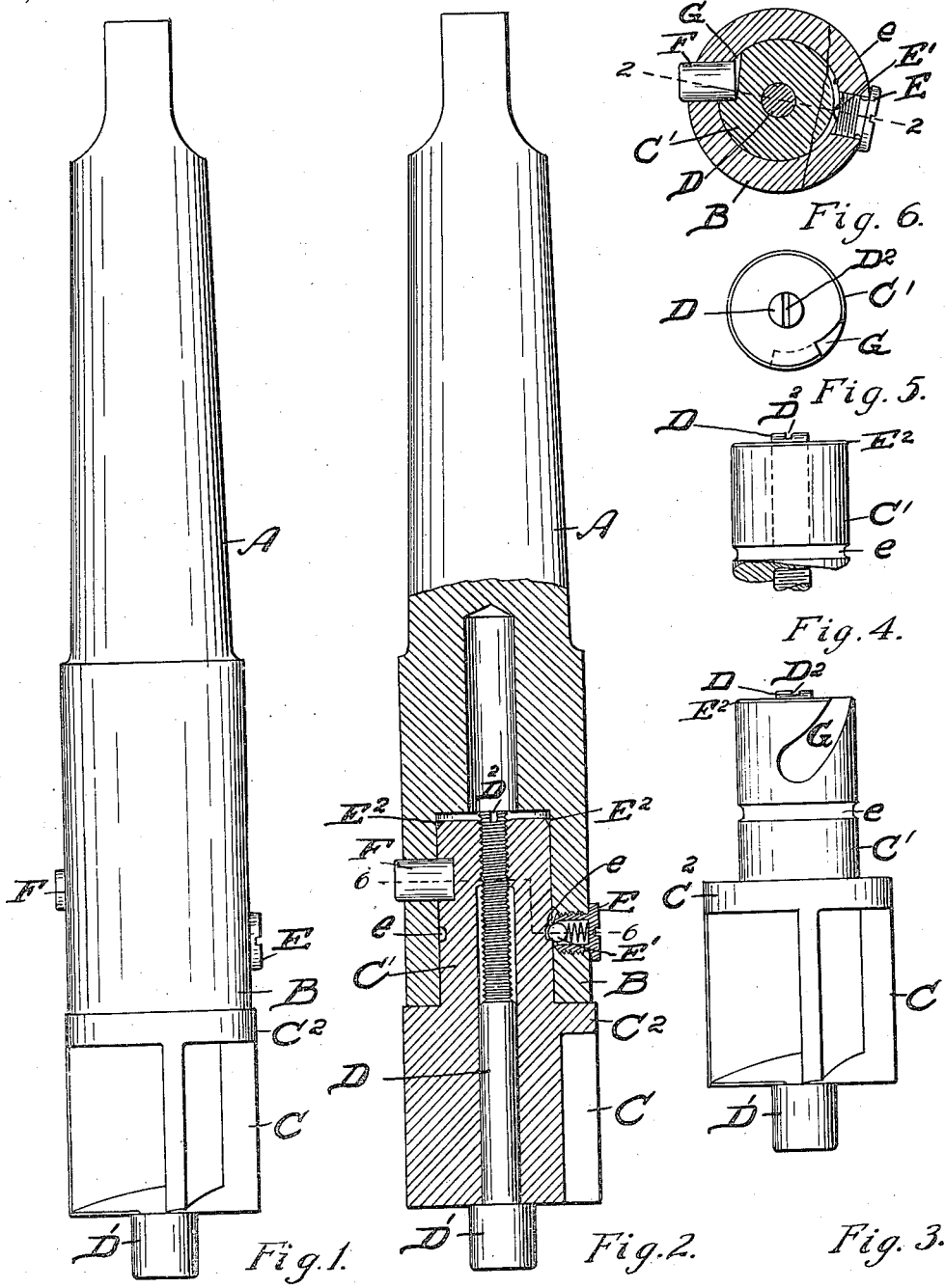

DEAN F. CARSCADDEN, OF FLINT, MICHIGAN.

COUNTERBORING-TOOL AND HOLDER.

1,214,754.      Specification of Letters Patent.      Patented Feb. 6, 1917.

Application filed November 17, 1915. Serial No. 61,928.

*To all whom it may concern:*

Be it known that I, DEAN F. CARSCADDEN, a citizen of the United States, residing at Flint, county of Genesee, State of Michigan, have invented a certain new and useful Improvement in Counterboring-Tools and Holders, and declare the following to be a full, clear, and exact description of the same, such as will enable others skilled in the art to which it pertains to make and use the same, reference being had to the accompanying drawings, which form a part of this specification.

My invention relates to a counterboring tool and holder, shown in the accompanying drawings, and more particularly pointed out in the following specification and claims.

One of the objects of this invention is to provide an efficient counterboring tool and holder of simple and inexpensive construction.

Another object is to provide means for the ready removal of the pilot-rod.

Another object is to provide means for automatically and yieldably engaging the shank of the tool in the holder upon entering the latter that it may not be accidentally released.

Another object of the invention is the means employed to further automatically lock the tool in the holder upon the operation of the tool in actual work.

Other advantages and improvements will hereafter appear.

In the drawings accompanying this specification: Figure 1 is a side elevation of the holder with the counterboring tool in position. Fig. 2 is a central, vertical, sectional view through the same with parts in elevation. Fig. 3 is a side elevation of the counterboring tool and "pilot" rod indicating means for adjusting or removing the latter;—showing also a spiral groove in the shank of the tool adapted to coact with a pin carried by the holder for locking the tool in the latter. Fig. 4 is a fragmentary detail of the shank of the tool, as viewed from the side opposite that shown in Fig. 3, indicating the annular groove or recess to receive the yieldable engaging detent. Fig. 5 is a plan view of the end of the shank indicating the kerf in the end of the pilot rod for adjusting and removing the latter;—showing the chamfered edge provided on the end of the shank that it may readily pass the yieldable engaging device in the holder, and also the opening into the spiral groove of the fastening device. Fig. 6 is a cross-sectional view on lines 6—6 of Fig. 2.

Referring now to the letters of reference placed upon the drawings: A, denotes the tool holder, B, its socket end, C, is a boring or other tool, the shank C′, of which is adapted to enter the socket B, of the holder. C², indicates a disk-shaped shoulder between the cutting blades and the shank adapted to bear against the end of the socket B, when locked in the holder.

D, indicates a pilot rod threaded a portion of its length, to engage the shank of the tool C, tapped to receive it.

D′, is an enlarged head formed on the projecting lower end of the pilot rod, designed to enter the hole in the metal to be counterbored to guide the tool.

D², is a kerf formed in the opposite projecting end of the pilot rod to receive a screw driver, whereby the pilot rod may be removed or adjusted.

E, is an annular screw projecting through the wall of the socket portion of the tool holder, serving as a cage for a spring projected ball or detent E′, adapted to enter an annular groove or depression e, formed in the periphery of the shank of the tool to receive it. The edge of the tool shank is slightly chamfered at its upper end, as indicated at E², in order that it may readily pass the spring projected ball E′, upon inserting the shank in the socket of the tool holder.

F, is a pin slightly tapering, carried by the wall of the socket portion of the tool holder and extending inwardly into the spiral slot or groove G, formed in the shank of the tool to lock the latter in the holder;—it being noted that only one side of the pin projects into the groove to receive the rotative thrust of the tool shank, the opposite side of the pin being backed by the wall of the socket portion (see Fig. 6) to offer resistance to the shearing strain due to the operation of the tool.

It will be obvious that upon inserting the shank of the tool in the socket of the holder that the spring projected ball E′, will enter the annular groove C, and thus secure the tool against accidental dislodgment from the holder;—while the pin F, of the holder upon entering the spiral groove G, will through the rotation of the tool in operation draw the shoulder C², of the tool into abutting relation with the socket end of the holder locking it therewith. To release the tool, it is held manually while rotating the holder in a reverse direction sufficiently to withdraw the pin F, from the spiral groove or slot, it may then be withdrawn from the spring actuated ball detent E', by pulling it out of the socket of the holder.

Having thus described my invention, what I claim is:—

1. In a device of the character described, a socket member, an inwardly projecting pin carried by the wall of the socket member, a tool having a shank formed with a spiral groove to receive the pin, whereby the tool may be locked to the socket member, said shank having a chamfered edge and an annular depression, a ball supporting cage mounted in the wall of the socket member, a ball housed within the cage, and a spring adapted to project said ball outwardly and into the depression formed in the shank of the tool, whereby the latter may be held against accidental release from the socket member.

2. In a device of the character described, a socket member, a yieldable engaging device mounted in the wall of the socket member adapted to engage the shank of a tool inserted therein, an inwardly directed pin projecting from the wall of the socket member, a counterboring tool having a shank fitted to the socket member, and an adjustable pilot rod having a screw engagement with the tool, the shank of said counterboring tool having a depression to receive the yieldable engaging device, and also a spiral groove to receive the pin of the socket member.

3. In a device of the character described, a socket member, a pin carried by the socket member having one side of its end projecting into the bore of the socket member to engage the shank of a tool, the opposite side of the pin being backed by the wall of said socket member, whereby it may sustain the rotative thrust of the tool, a tool having a shank fitted to the socket member formed with a spiral groove to receive the end of the pin, said shank also provided with a depression, and a spring actuated detent carried by the socket member adapted to enter the depression in the shank of the tool.

4. In a device of the character described, a socket member, a pin carried by the socket member having one portion only of its end projecting into the bore of the socket member to engage the shank of a tool, the other portion of the end of the pin being backed by the wall of the socket member, whereby it may sustain the rotative thrust of the tool, and a tool having a shank fitted to the socket member formed with a spiral groove to receive the projecting portion of the end of the pin.

In testimony whereof, I sign this specification in the presence of two witnesses.

DEAN F. CARSCADDEN.

Witnesses:
S. E. THOMAS,
J. L. DUFF.